US008825378B2

United States Patent
Ashton et al.

(10) Patent No.: US 8,825,378 B2
(45) Date of Patent: Sep. 2, 2014

(54) VEHICLE DRIFT DETERMINATION APPARATUS AND METHOD

(71) Applicant: Nissan North America, Inc., Franklin, TN (US)

(72) Inventors: Ryan S. Ashton, Wolverine Lake, MI (US); David T. Zdeb, South Lyon, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/749,991

(22) Filed: Jan. 25, 2013

(65) Prior Publication Data
US 2014/0214265 A1    Jul. 31, 2014

(51) Int. Cl.
*G01C 21/06*    (2006.01)
*G06F 17/00*    (2006.01)

(52) U.S. Cl.
CPC ..................................... *G06F 17/00* (2013.01)
USPC ......................................... 701/417; 701/33.5

(58) Field of Classification Search
CPC .............................. B60W 50/14; B60W 50/08
USPC .......................................... 701/33.5, 408, 417
See application file for complete search history.

(56) References Cited

U.S. PATENT DOCUMENTS

| 4,758,959 | A  | * | 7/1988  | Thoone et al. | 701/472 |
|-----------|----|---|---------|---------------|---------|
| 8,094,001 | B2 | * | 1/2012  | Murphy et al. | 340/436 |
| 8,244,464 | B2 | * | 8/2012  | Kutomi        | 701/412 |
| 8,571,789 | B2 | * | 10/2013 | Monde et al.  | 701/409 |
| 2007/0091173 | A1 | * | 4/2007 | Kade et al.   | 348/119 |
| 2007/0164852 | A1 | * | 7/2007 | Litkouhi      | 340/435 |
| 2010/0049433 | A1 | * | 2/2010 | Martin et al. | 701/201 |
| 2012/0109521 | A1 | * | 5/2012 | Rothschild    | 701/487 |
| 2013/0063595 | A1 | * | 3/2013 | Niem          | 348/148 |

OTHER PUBLICATIONS

Racelogic, Application Note—Centre Line Deviation, available at http://www.racelogic.co.uk/_downloads/vbox/Application_Notes/Centre%20Line%20Deviation.pdf at least as early as 2007.

* cited by examiner

*Primary Examiner* — Mary Cheung
*Assistant Examiner* — Rodney Butler
(74) *Attorney, Agent, or Firm* — Young, Basile, Hanlon & MacFarlane, P.C.

(57) ABSTRACT

Disclosed herein are embodiments of an apparatus and method for determining a drift of a vehicle. In one aspect, a vehicle testing apparatus for determining a drift of a vehicle from trajectory data indicative of a trajectory of the vehicle during a drift test comprises: a processor configured to execute instructions stored in a memory to: determine an initial local vehicle heading based on an initial trajectory dataset of the trajectory data, and determine, for the vehicle, an amount of drift indicative of a deviation of the vehicle from the initial local vehicle heading based on a comparison between the initial local vehicle heading and a drift test dataset of the trajectory data.

20 Claims, 6 Drawing Sheets

| VEHICLE TRAJECTORY DATA | | | | | | | |
|---|---|---|---|---|---|---|---|
| TIME | POSITION | | DISTANCE TRAVELED | SPEED | GLOBAL VEHICLE HEADING | CENTERLINE DEVIATION | OTHER VALUES |
| | LATITUDE | LONGITUDE | | | | | |
| | | | | | | | |
| | | | | | | | |
| | | | | | | | |
| | | | | | | | |
| ... | ... | ... | ... | ... | ... | ... | ... |

VEHICLE DRIFT DETERMINATION APPARATUS AND METHOD

TECHNICAL FIELD

The embodiments disclosed herein generally relate to the determination of drift characteristics for a vehicle during outflow testing.

BACKGROUND

Vehicle manufacturers often perform an assortment of outflow tests to ensure the quality of a vehicle following its assembly. For instance, one or more tests may be performed in order to determine the drift characteristics of a vehicle. In general, these tests are used to determine the vehicle's tendency, in the absence of a manual steering input, to deviate from a straight line while traveling on a canted track at a predetermined speed.

In a typical test, under the operation of a trained driver, the vehicle is driven along a canted track in alignment with a predetermined centerline. Subsequently, the driver discontinues steering input, after which time the drift characteristics of the vehicle are determined. The drift characteristics may be determined, for example, based on an observation by the driver of the deviation of the vehicle from the predetermined centerline at some specified portion of the vehicle's travel. The drift characteristics are then judged with reference to acceptable levels of drift in consideration of the cant of the track and other driving variables. Although such testing has proven to be satisfactory in determining the drift characteristics of the vehicle, vehicle manufactures may desire improvements upon these tests.

SUMMARY

Disclosed herein are embodiments of an apparatus and method for determining a drift of a vehicle. In one aspect, a vehicle testing apparatus for determining a drift of a vehicle from trajectory data indicative of a trajectory of the vehicle during a drift test comprises: a processor configured to execute instructions stored in a memory to: determine an initial local vehicle heading based on an initial trajectory dataset of the trajectory data, and determine, for the vehicle, an amount of drift indicative of a deviation of the vehicle from the initial local vehicle heading based on a comparison between the initial local vehicle heading and a drift test dataset of the trajectory data.

In another aspect, a method of performing a drift test for a vehicle comprises: receiving, in a memory, trajectory data indicative of a trajectory of the vehicle during a drift test; and determining, using a processor in communication with the memory: an initial local vehicle heading based on an initial trajectory dataset of the trajectory data, and for the vehicle, an amount of drift indicative of a deviation of the vehicle from the initial local vehicle heading based on a comparison between the initial local vehicle heading and a drift test dataset of the trajectory data.

In yet another aspect, a method of performing a drift test for a vehicle comprises: compiling trajectory data indicative of a lateral deviation of the vehicle at a longitudinal position along the trajectory from a centerline corresponding to an exemplary trajectory of the vehicle while responsive to a manual steering input by gathering, in order, at least: an initial trajectory dataset indicative of the trajectory of the vehicle subsequent to permitting the vehicle to travel without a steering input for a predetermined portion of the trajectory, and a drift test dataset indicative of the trajectory of the vehicle for a second predetermined portion of the trajectory and representative of the drift characteristics of the vehicle; receiving the data in a memory; and using a processor in communication with the memory to execute instructions stored in memory to: determine an angular offset between the centerline and an average heading of the vehicle corresponding to the initial trajectory dataset; estimate an angular offset between the average heading and a vector tangent to the trajectory of the vehicle corresponding to the initial trajectory dataset, and determine an amount of drift of the vehicle by adjusting the initial trajectory dataset according to the equation: adjusted initial trajectory dataset=$\sin(\theta+\alpha)*x+D$, wherein: $\theta$ is the angular offset between the average heading and the centerline, $\alpha$ is the angular offset between the tangent vector and the average heading, x is a longitudinal position along the trajectory, and D is a lateral deviation of the vehicle from the centerline at the longitudinal position along the trajectory.

These and other aspects will be described in additional detail below.

BRIEF DESCRIPTION OF THE DRAWINGS

The various features, advantages and other uses of the present apparatus will become more apparent by referring to the following detailed description and drawings in which.

DETAILED DESCRIPTION

Described herein are embodiments of a vehicle testing apparatus and method that are effective to determine the drift characteristics of a vehicle by determining and referencing an initial local vehicle heading.

Figures 1, 2:
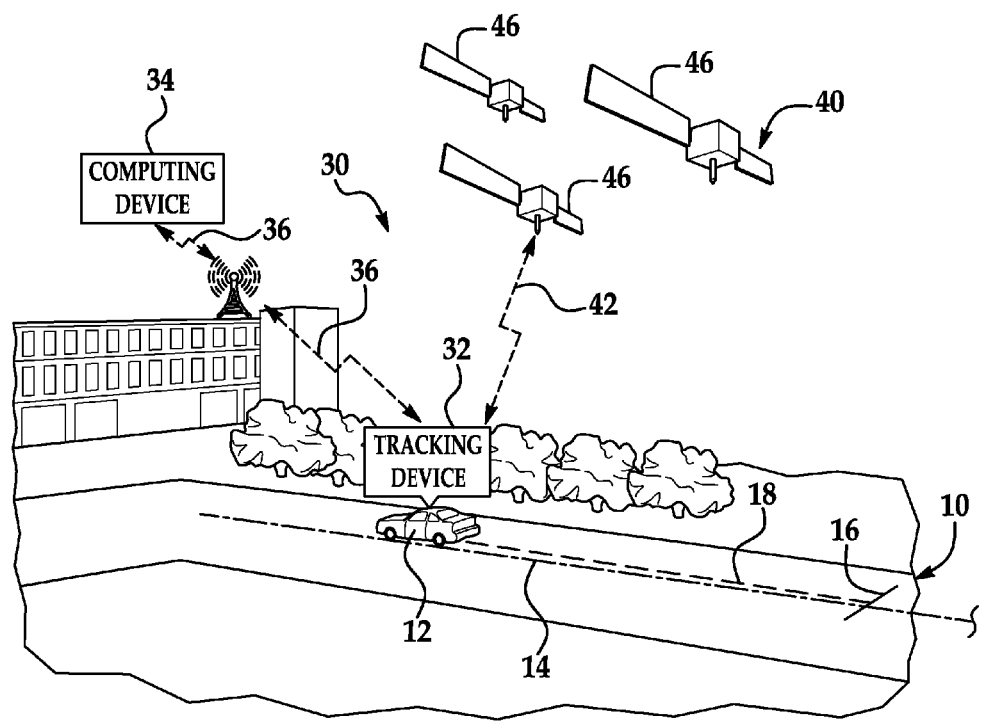
FIG. 1 is a schematic representation of an example of a vehicle drift test track and a testing apparatus for determining the drift characteristics of a vehicle.
FIG. 2 shows an example of a data structure for storing information concerning the trajectory of the vehicle during a drift test.

FIG. 1 is a schematic representation of an example of a vehicle drift test track 10 and a vehicle testing apparatus 30 for use in performing a drift test for a vehicle 12. The drift test is designed to allow a determination of the drift characteristics of the vehicle 12, which are indicative of the tendency of the vehicle 12 to deviate laterally to one side or the other of a straight line direction in the absence of a steering input while traveling at a predetermined speed. The vehicle drift test track 10 is configured to accommodate the travel of a vehicle 12 during the drift test. In particular, at least a portion of the vehicle drift test track 10 surrounds a substantially straight predetermined centerline 14, so as to permit generally straight ahead driving of the vehicle 12 along and about the predetermined centerline 14.

The components of the vehicle 12, e.g., the components of its powertrain and steering system, are designed and assembled so that the vehicle 12 exhibits substantially no drift while traveling on a long straight road under normal driving conditions. Therefore, in order to induce the vehicle 12 to exhibit drift for purposes of determining its drift characteristics, the vehicle drift test track 10 is canted, or sloped, to one side along the predetermined centerline 14. The cant in the vehicle drift test track 10 may be selected such that a resulting laterally directed component of the gravitational force acting on the vehicle 12 may overcome the ability of the vehicle 12 to exhibit substantially no drift in the absence of a steering input.

A starting point 16 is defined with respect to the predetermined centerline 14. The starting point 16 is defined at a position along the predetermined centerline 16 so as to allow the vehicle 12 to achieve generally straight ahead travel and to reach the predetermined speed prior to reaching the starting point 16. As explained in greater detail below, the steering input is discontinued when the vehicle 12 reaches the starting point 16, and the behavior of the vehicle 12 after the steering input is discontinued (represented graphically in FIG. 1 as vehicle path 18) may be evaluated to determine the drift characteristics of the vehicle 12.

FIG. 1 further illustrates components of an exemplary vehicle testing apparatus 30 configured for determining and judging the drift characteristics of the vehicle 12 that are exhibited during the drift test. As shown, the vehicle 12 is outfitted with a tracking device 32 communicatively coupled to a computing device 34 over a communications channel 36. The communication channel 36 is configured to allow for sharing of information, data and/or computing resources between the tracking device 32 and the computing device 34. The communication channel 36 may be a wired or wireless channel, for example, using an industry standard or proprietary protocol. For instance, as represented graphically, the communication channel 36 may implement Wi-Fi network technology.

The tracking device 32 is further communicatively coupled to a global positioning system (GPS) 40 over a communications channel 42. The communication channel 42 may be a wireless channel, for example, using an industry standard or proprietary protocol. The illustrated GPS 40 comprises a plurality of satellites 46, which are configured to communicate signals to the tracking device 32 that permit the position of the tracking device 32, and by extension the vehicle 12, to be determined. In a non-limiting example, the position of the vehicle 12 may be associated with a coordinate system, such as a geographic coordinate system, for instance, that specifies position with reference to a latitude and longitude. Although a conventional GPS 40 is shown and described, it will be understood that other positioning systems presently or hereinafter known may be implemented in communication with the tracking device 32 to determine the position of the vehicle 12.

The tracking device 32, the computing device 34 and optionally, other devices, may be configured with respective hardware so that collectively the signals may be received from the satellites 46, multiple positions of the vehicle 12 while traveling along the vehicle drift test track 10 during the drift test may be determined, data indicative of the positions may be stored in memory, and so that other operations described in further detail below may be performed with respect to the data. In the illustrated example, the tracking device 32 and the computing device 34 may each be one or multiple computers including a random access memory (RAM), a read-only memory (ROM) and a central processing unit (CPU) in addition to various input and output connections. Generally, the control functions described herein can be implemented by one or more software programs stored in internal or external memory and are performed by execution by the respective CPUs of the tracking device 32 and the computing device 34. However, some or all of the functions could also be implemented by hardware components.

Although the tracking device 32 and the computing device 34 are shown as separate units and described as performing respective operations, it will be understood that the operational aspects of the tracking device 32 and the computing device 34 may be distributed differently than as specifically described. In one alternative, for example, the operational aspects of the tracking device 32 and the computing device 34 could be embodied in a single unit.

As described above, the satellites 46 of the GPS 40 are configured to communicate signals to the tracking device 32 that permit the position of the vehicle 12 to be determined. The tracking device 32 is configured to determine multiple positions of the vehicle 12 during the drift test. As represented in FIG. 2, these positions can be correlated to a time element and stored in a database 50 as vehicle trajectory data 52.

In general, the vehicle trajectory data 52 is indicative of the trajectory of the vehicle 12 during the drift test. The vehicle trajectory data 52 may include raw values that, as shown, correspond to the position of the vehicle 12, which in an exemplary geographic coordinate system is specified as both a latitude and a longitude, and a time at which the vehicle 12 was located at each position.

Values that correspond to other aspects of the trajectory of the vehicle 12 may also be determined from the raw values of the vehicle trajectory data 52 and stored in the database 50 as vehicle trajectory data 52. For example, for each time, values corresponding to the distance traveled by the vehicle 12 and the speed at which the vehicle 12 is traveling may be determined. In addition, values that furthermore correspond to the drift characteristics of the vehicle 12 may be determined. For instance, as shown, the vehicle trajectory data 52 may include a global vehicle heading (that is, the angular heading of the vehicle 12 with respect to the predetermined centerline 14) and a centerline deviation (for example, a lateral deviation of the vehicle 12 from the predetermined centerline 14). Although the values in this example are determined in association with the predetermined centerline 14, other references may be used, as explained below.

It will be understood that multiple relationships and dependencies may exist between the values of the vehicle trajectory data 52 set forth above and further values corresponding to other aspects of the trajectory of the vehicle 12. Therefore, the vehicle trajectory data 52 may include less than all of the values set forth above, either alone or in combination with additional values that are individually and/or in combination with other values indicative of the trajectory of the vehicle 12 during the drift test.

Figure 3:
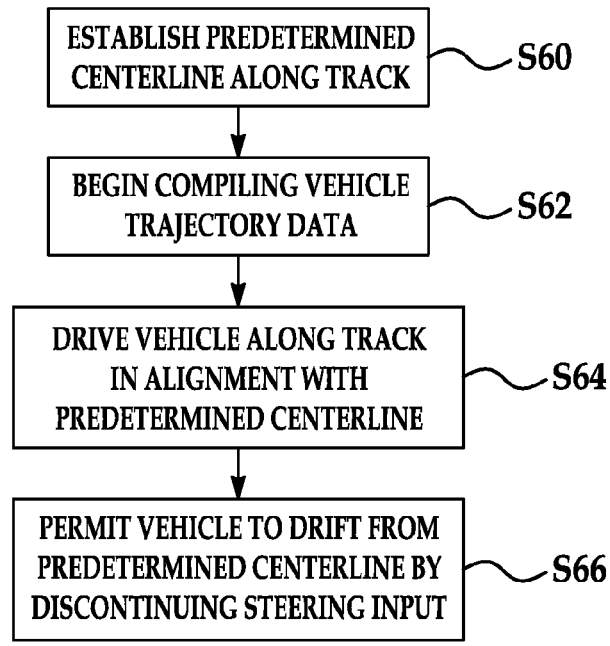
FIG. 3 is a flow diagram depicting performance of the drift test and compilation of vehicle trajectory data.

Exemplary operations for performing the drift test are shown in FIG. 3. In step S60, the predetermined centerline 14 is established with respect to the vehicle drift test track 10. In a non-limiting example, the predetermined centerline 14 is established as data in a memory of the tracking device 12. The predetermined centerline 14 is indicative of an ideal path of the vehicle 12 along the vehicle drift test track 10 during the drift test, during straight ahead driving and under the influence of a steering input. The predetermined centerline 14 may be embodied in a similar manner as the vehicle trajectory data 52. For example, the predetermined centerline 14 may be embodied as data including values corresponding to positions along the vehicle drift test track 10. These values, like the values of vehicle trajectory data 52 that correspond to the position of the vehicle 12, can be specified as both a latitude and a longitude, for example.

In this example, the tracking device 32 may be configured to derive the predetermined centerline 14 from multiple values corresponding to the position of the vehicle 12 as the vehicle 12 is operated to travel in a substantially straight path along the vehicle drift test track 10 in accordance with a desired predetermined centerline 14. In an alternative example, the tracking device 32 may be configured to derive the predetermined centerline 14 from values corresponding to positions along the ideal path of the vehicle 12 that are manually input by a user. For instance, a user could input a value corresponding to a first position representative of a beginning of the ideal path, and a value corresponding to a second position representative of an ending of the ideal path.

In step S62, the tracking device 12 is triggered to begin compilation of the vehicle trajectory data 52 in the database 50. As described above, in addition to determining and storing raw values that correspond to the position of the vehicle 12 and a time at which the vehicle 12 was located at each position, values corresponding to other aspects of the trajectory of the vehicle 12 may also be determined.

In general, to perform the drift test, the vehicle 12 is initially operated by a trained driver in step S64 to travel at a predetermined speed along the vehicle drift test track 10. During this initial operation of the vehicle 12, the vehicle 12 is operated under the influence of a steering input to travel in substantial alignment with the predetermined centerline 14.

In step S66, when the vehicle 12 reaches the starting point 18, the driver, while otherwise operating the vehicle 12 to maintain the predetermined speed, discontinues the steering input by, for example, releasing a steering wheel. After the steering input is discontinued, although the vehicle 12 maintains general alignment with the predetermined centerline 14, the vehicle 12 is induced to drift by the cant in the vehicle drift test track 10. Although the operation of the vehicle 12 during the drift test is described with reference to a trained driver, it will be understood that this is provided as a non-limiting example, and that the vehicle 12 may be subject to remote and/or autonomous operation for some of or the entire drift test.

Figure 4:
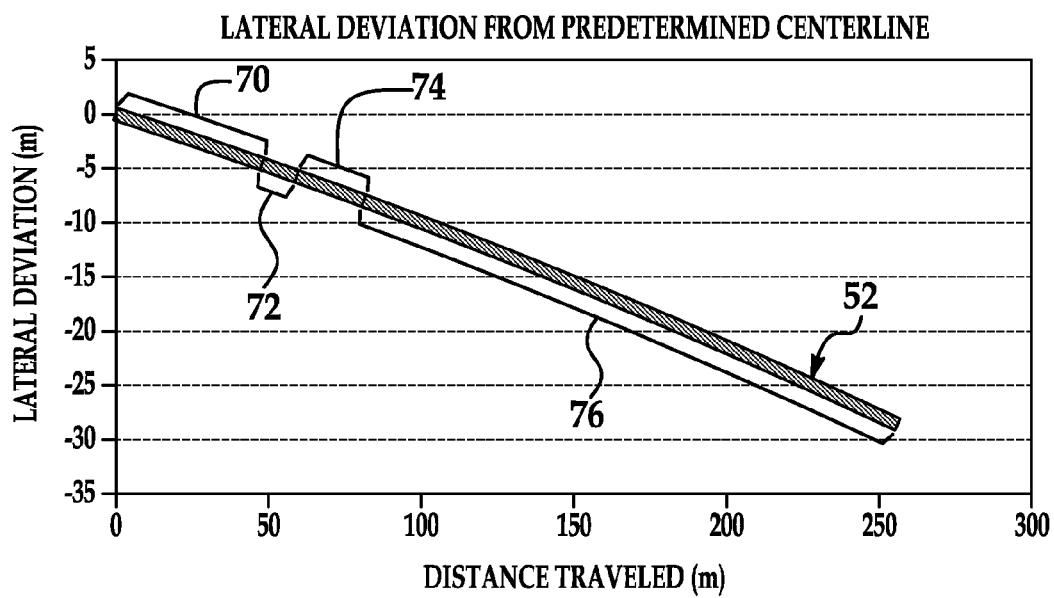
FIG. 4 is a graphical representation of the drift characteristics of the vehicle during the drift test, based on the vehicle trajectory data, in the form of a lateral deviation of the vehicle from a predetermined centerline.

Selected values of the trajectory data 52 that correspond to the drift characteristics of the vehicle 12 are represented graphically in FIG. 4. These values were derived from an exemplary and non-limiting experimental drift test in which a vehicle 12 was operated to travel at a speed of approximately 86 km/h and in accordance with operations S60-S66 set forth above. Specifically, FIG. 4 represents the lateral deviation of the vehicle 12 from a predetermined centerline 14 as a function of the distance traveled by the vehicle 12.

Figure 5:
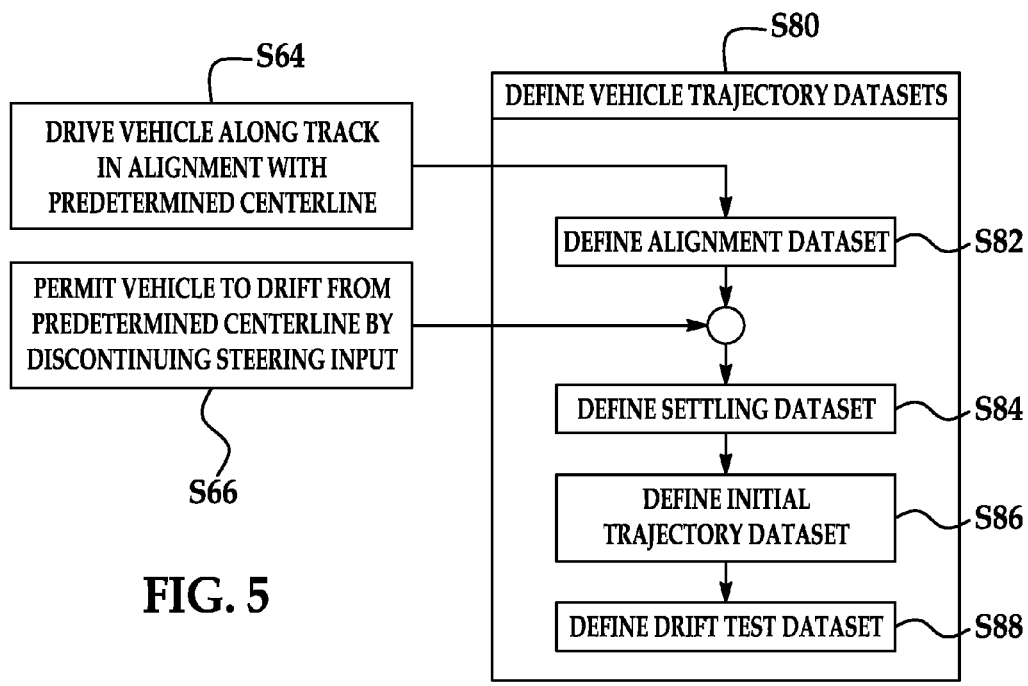
FIG. 5 is a flow diagram depicting operations for defining datasets within the vehicle trajectory data compiled during performance of the drift test.

Following compilation of the vehicle trajectory data 52, the vehicle trajectory data 52 may be shared between the tracking device 32 and the computing device 34 over the communications channel 36 to permit further analysis in conjunction with the computing device 34. As shown in FIG. 4 and explained with further reference to FIG. 5, multiple datasets 70, 72, 74 and 76, each indicative of one or more portions of the trajectory of the vehicle 12 during the drift test, may be defined within the vehicle trajectory data 52. Each of the portions of the trajectory of the vehicle 12 indicated by the respective datasets 70, 72, 74 and 76 may be defined with reference to, for example, events occurring during performance of the drift test and/or with reference to certain aspects of the trajectory of the vehicle 12. As explained below, in step S80, the datasets 70, 74, 76 and 78 may be selected and defined within the vehicle trajectory data 52 in order to enable advantageous determinations by the computing device 34 concerning the drift characteristics of the vehicle 12.

An alignment dataset 70 is defined in step S82, and originates in general unison with the initiation of the operation of the vehicle 12 in step S64. The alignment dataset 70 is indicative of the trajectory of the vehicle 12 while the vehicle 12 is responsive to a steering input configured to steer the vehicle to travel in substantial alignment with the predetermined centerline 14.

A settling dataset 72 is defined in step S84. The settling dataset 72 is indicative of a portion of the trajectory of the vehicle 12 immediately following termination of the steering input in step S66. In general, the portion of the trajectory of the vehicle 12 indicated by the settling dataset 72 may be defined so that the vehicle 12 is sufficiently purged from the influence of the steering input prior to compiling additional datasets 74 and 76 of the vehicle trajectory data 52, which are, as described below, evaluated to further determine the drift characteristics of the vehicle 12. Slight extraneous components to the steering input may arise, for example, when the driver inadvertently grazes the steering wheel while releasing it. The portion of the trajectory of the vehicle 12 indicated by the settling dataset 72 may be defined, for example, with respect to an amount of time that the vehicle 12 travels independently of the steering input, with respect to an amount of distance traveled by the vehicle 12 following termination of the steering input, or with respect to some other aspect of the trajectory of the vehicle 12.

As a non-limiting example, for the drift test in which a trained driver operated the vehicle 12 to travel at a speed of approximately 86 km/h, it was found that the vehicle 12 was sufficiently purged from the influence of a steering input after 10 meters of travel. Under this example, therefore, the settling dataset 72 may be defined as indicative of the trajectory of the vehicle 12 for approximately 10 meters of travel following termination of the steering input. However, it will be understood that the settling dataset 72 may be defined differently based upon variances in driving variables and/or the control environment for the vehicle 12. It is contemplated that under some control environments for the vehicle 12, for example, it may not be necessary to define a settling dataset 72.

An initial trajectory dataset 74 is defined in step S86 following the settling dataset 72. The initial trajectory dataset 74 is indicative of a portion of the trajectory of the vehicle 12 occurring after permitting the vehicle 12 to travel independently of the steering input for a predetermined portion of the trajectory. Because the initial trajectory dataset 74 is defined subsequently in time to the settling dataset 72, the initial trajectory dataset 74 will be indicative of a portion of the trajectory of the vehicle 12 while the vehicle 12 is sufficiently purged from the influence of the steering input. The portion of the trajectory of the vehicle 12 indicated by the initial trajectory dataset 74 may additionally be defined as a portion of the trajectory in which the vehicle 12 does not yet exhibit significant amounts of drift. It can be seen that, in this example, the portion of the trajectory of the vehicle 12 indicated by the initial trajectory dataset 74 is not substantially influenced by either extraneous components to the steering input or the drift characteristics of the vehicle 12.

For the exemplary drift test described above, it was found that the initial trajectory dataset 74 may be defined as indicative of the trajectory of the vehicle 12 for approximately 20 meters of travel following the portion of the trajectory of the vehicle 12 indicated by the settling dataset 72. However, it will be understood that the initial trajectory dataset 72 may be defined differently based upon variances in driving variables and/or the control environment for the vehicle 12.

Finally, the remainder of the vehicle trajectory data 52 is defined in step S88 as a drift test dataset 76. In general, the portion of the trajectory of the vehicle 12 indicated by the drift test dataset 76 is that in which the vehicle 12 exhibits drift characteristics.

In the illustrated example, the vehicle trajectory data 52 includes the sequentially defined datasets 70, 72, 74 and 76, which are described as distinct and contiguous within the vehicle trajectory data 52. However, it will be understood that there may be some overlap between datasets, and that additional and/or alternative datasets may be selected and defined within the vehicle trajectory data 52.

Figure 6:
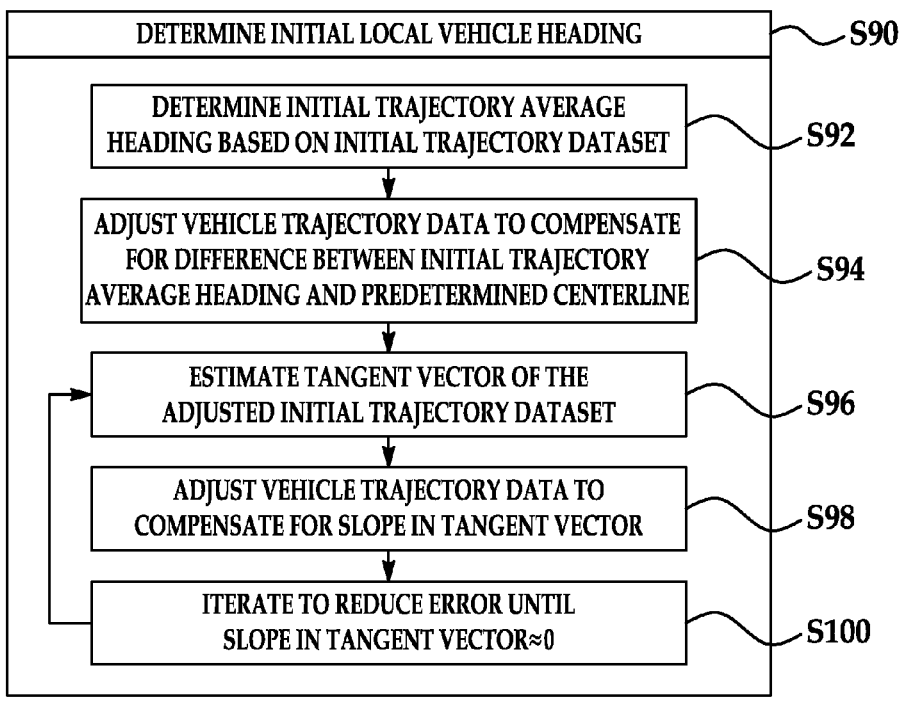
FIG. 6 is a flow diagram depicting operations for determining an initial local vehicle heading for the vehicle during the drift test based on the datasets.

As noted above, the portion of the trajectory of the vehicle 12 indicated by the initial trajectory dataset 74 is not substantially influenced by either extraneous components to the steering input or the drift characteristics of the vehicle 12. Therefore, the initial trajectory dataset 74 may be evaluated in order to estimate an actual initial path of the vehicle 12 (as opposed to the ideal path of the vehicle 12 indicated by the predetermined centerline 14), prior to the vehicle 12 being significantly induced to drift, for purposes of further determining the drift characteristics of the vehicle 12. By determining the drift characteristics of the vehicle 12 with reference to an estimated actual initial path of the vehicle 12, based on the initial trajectory dataset 74, it is possible to lessen the effect of slight errors in alignment of the vehicle 12 with the predetermined centerline 14 in step S64 of the drift test. Exemplary operations for estimating the actual initial path of the vehicle 12 are described below with reference to FIG. 6.

Figure 7:
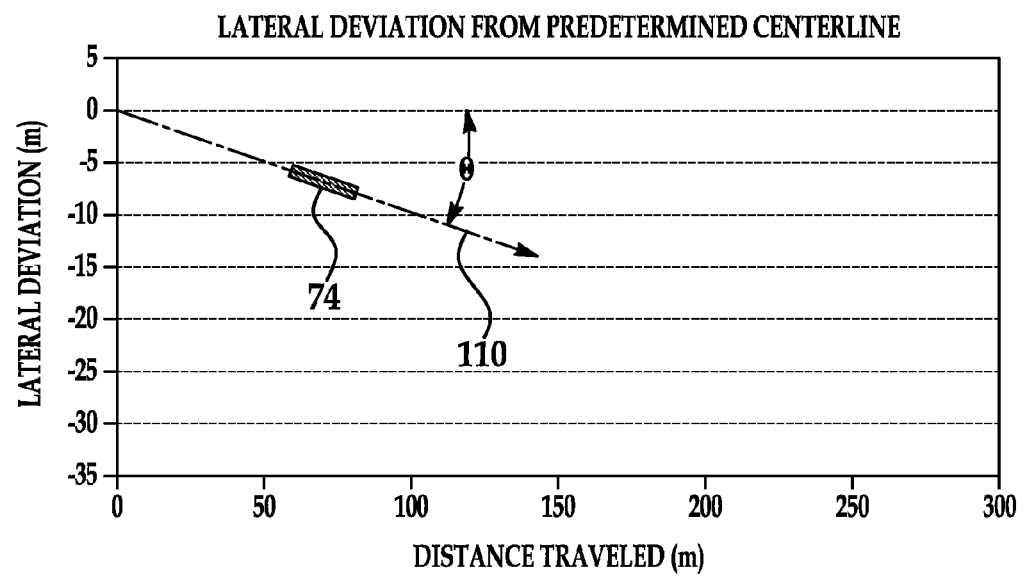
FIG. 7 is a graphical representation of an angular offset between the predetermined centerline and an initial trajectory average heading for the vehicle during the drift test.

In step S90, the computing device 34 estimates the actual initial path of the vehicle 12, from the vehicle trajectory data 52, as an initial local vehicle heading. In the illustrated non-limiting example, an initial trajectory average heading 110 is first determined in step S92 based on the initial trajectory dataset 74, as shown with additional reference to FIG. 7. The initial trajectory average heading 110 is indicative of an average of the global vehicle heading of the vehicle 12 (that is, an average of the angular heading of the vehicle 12 with respect to the predetermined centerline 14) during the portion of the trajectory of the vehicle 12 indicated by the initial trajectory dataset 74. In this example, as shown in FIG. 7, a difference between the initial trajectory average heading 110 and the predetermined centerline 14 may be represented as an angular offset θ between the initial trajectory average heading 110 and the predetermined centerline 14.

In step S94, the values of one or more portions of the vehicle trajectory data 52 may be adjusted to compensate for the difference between the initial trajectory average heading 110 and the predetermined centerline 14. Step S94 may be achieved, for example, according to Equation 1:

$$\text{adjusted vehicle trajectory data} = \sin(\theta){*}x + D \quad \text{[Equation 1]}$$

In Equation 1, the values represented by x are values corresponding to a longitudinal position of the vehicle 12 along its trajectory during the drift test. In this example, the x values are distances traveled by the vehicle 12 at respective times. The values represented by D are values corresponding to lateral deviations of the vehicle 12 from the predetermined centerline 14 at respective longitudinal positions along the trajectory.

Figure 8:
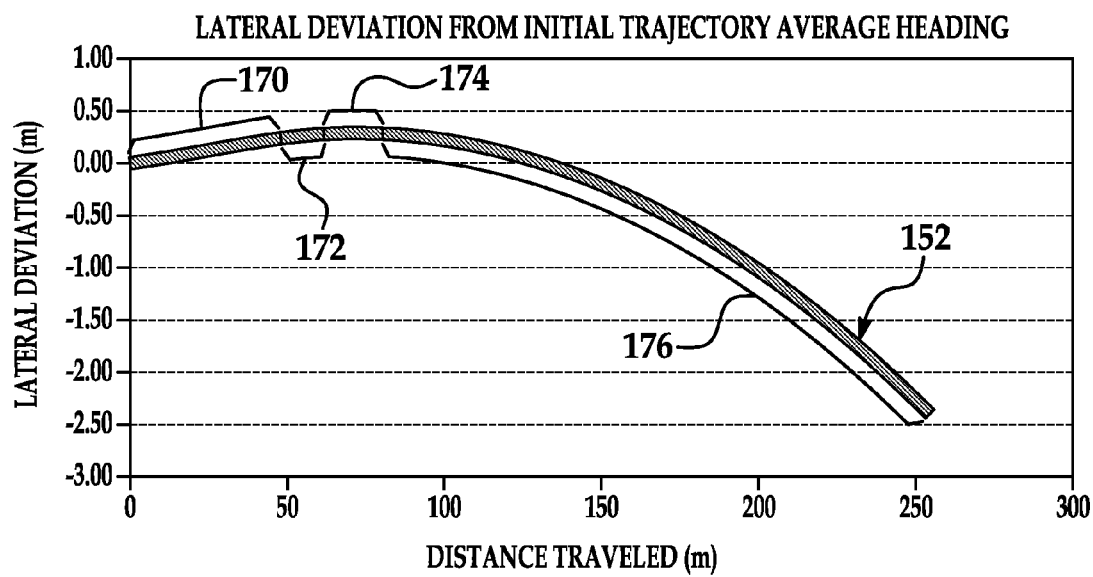
FIG. 8 is a graphical representation of the drift characteristics of the vehicle during the drift test, in the form of a lateral deviation of the vehicle from the initial trajectory average heading.

Adjusted vehicle trajectory data 152 is represented graphically in FIG. 8. Although other values of the adjusted vehicle trajectory data 152 corresponding to the drift characteristics of the vehicle 12 may be considered, in furtherance to the example presented above with respect to FIG. 4, FIG. 8 represents a lateral deviation of the vehicle 12 from the initial trajectory average heading 110 as a function of the distance traveled by the vehicle 12. It can be seen that, in general, the above application of Equation 1 results in a realignment of the coordinate system with respect to which determinations are made concerning the drift characteristics of the vehicle 12. In particular, in FIG. 4, the coordinate system used to represent values corresponding to the lateral deviation of the vehicle 12 during the drift test is correlated to the predetermined centerline 14. As can be seen in FIG. 8, however, the coordinate system used to represent values corresponding to the lateral deviation of the vehicle 12 is correlated to the initial trajectory average heading 110.

In the above example, Equation 1 is explained and illustrated as being applied to all of the vehicle trajectory data 52, resulting in an adjusted alignment dataset 170, an adjusted settling dataset 172, an adjusted initial trajectory dataset 174 and an adjusted drift test dataset 176. However, because only the adjusted initial trajectory dataset 174 is evaluated in estimating the actual initial path of the vehicle 12, it will be understood that Equation 1 need not be applied to the alignment dataset 70, the settling dataset 72 or the drift test dataset 76.

Figure 9:
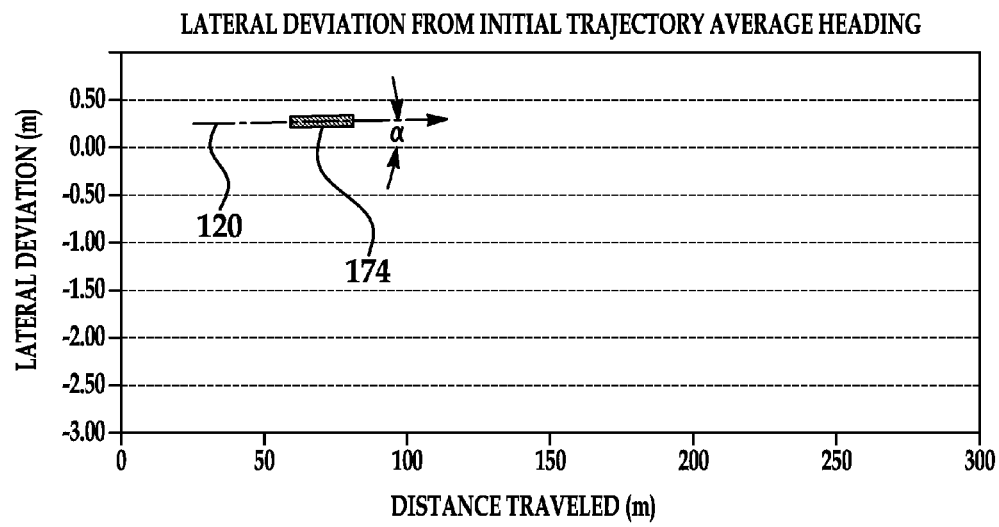
FIG. 9 is a graphical representation of an angular offset between the initial trajectory average heading and a tangent vector that is estimated from a dataset adjusted to correlate to the initial trajectory average heading and used to determine the initial local vehicle heading.

With further reference to FIG. 9, in step S96, a tangent vector 120 of the adjusted initial trajectory dataset 174 is estimated. Estimation of the tangent vector 120 may be achieved, for example, by determining a trend line of the values of the adjusted initial trajectory dataset 174. By estimating the tangent vector 120 to be tangent to the portion of the trajectory of the vehicle 12 indicated by the adjusted initial trajectory dataset 174, the tangent vector 120 is substantially indicative of the actual initial path of the vehicle 12 during the drift test. In this example, as shown in FIG. 9, the tangent vector 120 is defined by an angle α, which is a slope of the tangent vector 120 with respect to a coordinate system correlated to the initial trajectory average heading 110 through application of Equation 1.

In step S98, the values of one or more portions of the vehicle trajectory data 52 may be adjusted to compensate for the slope a in the tangent vector 120. Step S98 may be achieved, for example, according to Equation 2:

$$\text{adjusted vehicle trajectory data} = \sin(\theta+\alpha){*}x + D \quad \text{[Equation 2]}$$

Equation 2 may, as shown, incorporate the adjustment of Step S94, so that the adjustment in step S98 is achieved with respect to the vehicle trajectory data 52. However, because the effect of the adjustments on the vehicle trajectory data 52 in Equations 1 and 2 are cumulative, it can be seen that the adjustment in step S98 could equivalently be achieved with respect to the adjusted vehicle trajectory data 152 from step S94 by eliminating the value θ from Equation 2.

In addition, as shown in step S100, further iterative tangent vector estimates and adjustments to the vehicle trajectory data 52 may be made until, for the last iteration, a slope of the tangent vector is substantially zero. For instance, additional tangent vector estimates may be made, each with respect to vehicle trajectory data previously adjusted according to Equation 2 in step S98, until a slope of an estimated tangent vector is substantially zero with respect to a coordinate system correlated to a tangent vector previously determined in step S98. Once a slope of an estimated tangent vector is substantially zero, the vehicle trajectory data 52 may be adjusted in the last iteration according to Equation 2 in step S98. Therefore, it will be understood that the value a may be inclusive of multiple slopes of tangent vectors estimated in this iterative process, that is, a may equal $\alpha 1+\alpha 2+ \ldots \alpha n$, where an is substantially zero. For the exemplary drift test described above, for instance, it was found that three iterations according to step S100 were sufficient to reduce the slope of an estimated tangent vector substantially to zero (that is, a equals $\alpha 1+\alpha 2+\alpha 3$, where $\alpha 3$ is substantially zero). When the slope of a tangent vector 120 is reduced substantially to zero, the tangent vector 120 is substantially indicative of the actual initial path of the vehicle 12 during the drift test, and can be taken as the initial local vehicle heading for purposes of determining the drift characteristics of the vehicle 12 during the drift test.

In the above example, although Equation 2, if desired, may be applied to any or all of the datasets 70, 72, 74 and 76 of the vehicle trajectory data 52. However, Equation 2 may only be applied only to the initial trajectory dataset 74 for all but the final iteration, after the slope of an estimated tangent vector is substantially zero. Then, during the final iteration, Equation 2 may be applied to the drift test dataset 76 to result in an adjusted drift test dataset 276 of adjusted vehicle trajectory data 252, which is represented graphically in FIG. 10. For reference, the adjusted drift test dataset 176 achieved in step S94 is also represented.

Figure 10:
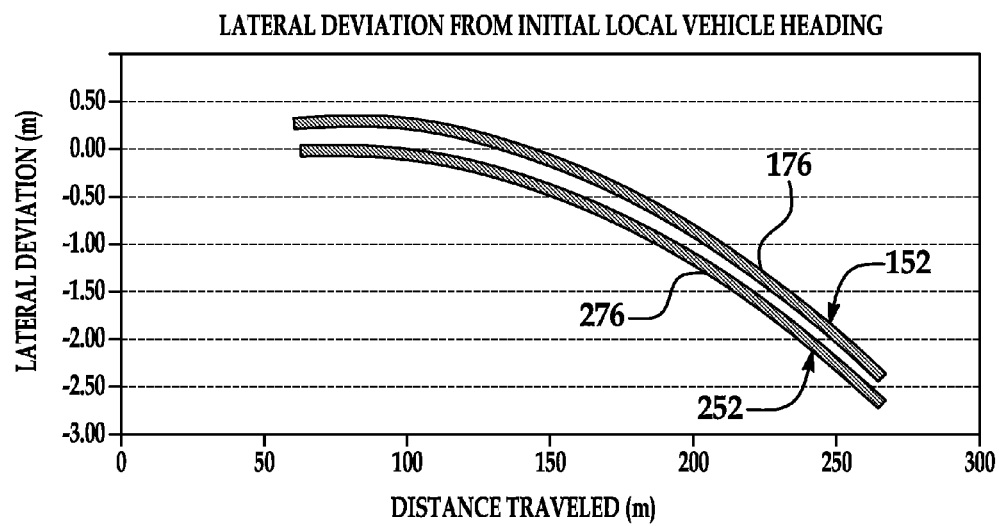
FIG. 10 is a graphical representation of the drift characteristics of the vehicle during the drift test, in the form of a lateral deviation of the vehicle from the initial local vehicle heading.

Once again, in furtherance to the example presented above with respect to FIGS. 4 and 8, FIG. 10 represents a lateral deviation of the vehicle 12 from the initial local vehicle heading as a function of the distance traveled by the vehicle 12. It can be seen that, in general, the above application of Equation 2 results in a realignment of the coordinate system with respect to which determinations are made concerning the drift characteristics of the vehicle 12. In particular, in FIG. 10, the coordinate system used to represent values corresponding to the lateral deviation of the vehicle 12 is correlated to the initial local vehicle heading determined in step S90.

In the foregoing discussion, the tangent vector 120 is explained as serving as a baseline for determining the initial local vehicle heading. In the above example, the tangent vector 120 is associated with the predetermined centerline 14 through successive application of Equations 1 and 2, such that, in general, the adjusted drift test dataset 276 reflects differences between the tangent vector 120 and the predetermined centerline 14. In particular, the adjusted drift test dataset 276 is indicative of differences in orientation between the tangent vector 120 and the initial trajectory average heading 110, and by extension, differences in orientation between the tangent vector 120 and the predetermined centerline 14.

However, it is contemplated that the adjusted drift test dataset 276 could otherwise be indicative of differences between the tangent vector 120 and the predetermined centerline 14. For example, in one alternative determination of the initial local vehicle heading in step S90, determination of the initial trajectory average heading 110 in step S92 and adjustment of the vehicle trajectory data 52 through application of Equation 1 may be eliminated, and the slope of the tangent vector 120 could be defined directly with respect to the predetermined centerline 14 in step S96.

In another alternative, the tangent vector 120 may be estimated without reference to the predetermined centerline. In this alternative, for example, the tangent vector 120 may be determined based on the initial trajectory dataset 74 and compared directly to the drift test dataset 76.

Figure 11:
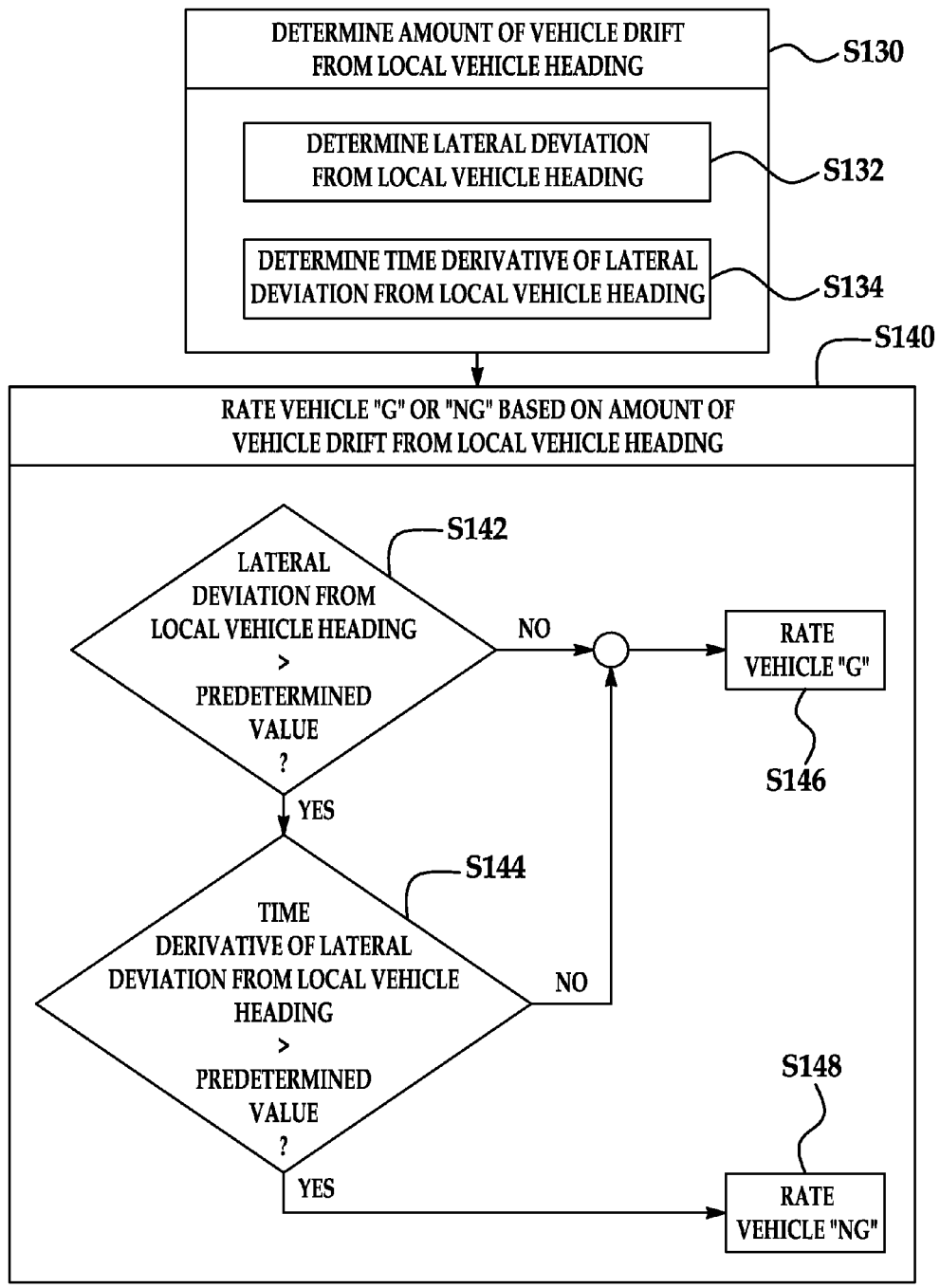
FIG. 11 is a flow diagram depicting operations for determining drift characteristics of the vehicle with reference to the initial local vehicle heading and for judging the vehicle as passing or failing the drift test.

As shown with further reference to FIG. 11, in step S130, an amount of vehicle drift exhibited by the vehicle 12 during the drift test is determined with reference to the initial local vehicle heading. In general, the amount of vehicle drift is determined based on a comparison between the initial local vehicle heading and the drift test dataset 76, and may be quantified as one or more values directly or indirectly indicative of the drift characteristics of the vehicle 12.

Different aspects of the amount of vehicle drift may be quantified. For instance, in step S132, in accordance with the non-limiting example described above, the drift characteristics of the vehicle 12 could concern the amount of lateral deviation of the vehicle 12 from the initial local vehicle heading during the drift test. In particular, after the coordinate system used to represent values corresponding to the lateral deviation of the vehicle 12 is correlated to the initial local vehicle heading, the lateral deviation of the vehicle 12 from the initial local vehicle heading is given in the adjusted drift test dataset 276 as a function of the distance traveled by the vehicle 12.

Additionally, as shown in step S134, one or more time derivatives of the lateral deviation of the vehicle 12 from the initial local vehicle heading during the drift test may be determined. As noted above, the vehicle 12 is induced to drift by a laterally directed component of the gravitational force acting on the vehicle 12 arising from the cant in the vehicle drift test track 10. Because this force acts over time to induce the vehicle to drift gradually further from the initial local vehicle heading, it is contemplated that time derivatives, e.g., lateral velocity and/or acceleration, of the lateral deviation from the initial local vehicle heading, can be evaluated as useful indicators of the drift characteristics of the vehicle. For the exemplary drift test described above, for instance, it was found that consideration of lateral velocity advantageously reduced the occurrence of false positives in judging the drift characteristics of the vehicle 12. As with the lateral deviation of the vehicle 12 from the initial local vehicle heading, the time derivatives of the lateral deviation may be given as a function of the distance traveled by the vehicle 12, for example.

In step S140, the vehicle 12 is rated "G" (that is, good, or passing the drift test) or "NG" (that is, not good, or failing the drift test) based on the amount of vehicle drift exhibited by the vehicle 12 from the initial local vehicle heading during the drift test. In the illustrated example, in step S142, it is determined whether the amount of lateral deviation of the vehicle 12 from the initial local vehicle heading during the drift test, as quantified in step S132, exceeds a predetermined value. Similarly, in step S144, it is determined whether the amount of a time derivative (e.g., a lateral velocity or lateral acceleration) of the lateral deviation of the vehicle 12 from the initial local vehicle heading during the drift test, as quantified in step S134, exceeds a predetermined value. As demonstrated in FIG. 12, if only one or neither of the determinations in steps S142 and S144 is satisfied, then the vehicle 12 is rated "G" in step S146. However, if both of the determinations in steps S142 and S144 are satisfied, then the vehicle 12 is rated "NG" in step S148.

In other alternative examples, the vehicle 12 may be rated according to logic that is different from that which is specifically shown. In particular, it will be understood that the lateral deviation of the vehicle 12 from the initial local vehicle heading and/or one or more time derivatives of the lateral deviation from the initial local vehicle heading may be determined individually or in any combination and compared to respective predetermined value(s) in rating the vehicle 12. For instance, only one of a lateral deviation, a lateral velocity, or a lateral acceleration from the initial local vehicle heading may be determined and compared to a respective predetermined value in rating the vehicle 12. Alternatively, a lateral deviation, a lateral velocity, and a lateral acceleration from the initial local vehicle heading may all be determined and compared to respective predetermined values in rating the vehicle 12. In these examples, if less than all of the quantified drift characteristics of the vehicle 12 exceed a respective predetermined value, then the vehicle 12 may be rated "G". However, if all of the quantified drift characteristics of the vehicle 12 exceed a respective predetermined value, then the vehicle 12 may be rated "NG".

In other alternative examples, the vehicle 12 may be rated according to logic that is different from that which is specifically shown. In particular, it will be understood that the lateral deviation of the vehicle 12 from the initial local vehicle heading and/or one or more time derivatives of the lateral deviation from the initial local vehicle heading may be determined individually or in any combination and compared to respective predetermined value(s) in rating the vehicle 12. For instance, only one of a lateral deviation, a lateral velocity, or a lateral acceleration from the initial local vehicle heading may be determined and compared to a respective predetermined value in rating the vehicle 12. Alternatively, a lateral deviation, a lateral velocity, and a lateral acceleration from the initial local vehicle heading may all be determined and compared to respective predetermined values in rating the vehicle 12. In these examples, if less than all of the quantified drift characteristics of the vehicle 12 exceed a respective predetermined value, then the vehicle 12 may be rated "G". However, if all of the quantified drift characteristics of the vehicle 12 exceed a respective predetermined value, then the vehicle 12 may be rated "NG".

It will be understood that the foregoing examples are non-limiting, and that many alternative and/or additional aspects of the amount of vehicle drift may be quantified for purposes of judging the drift characteristics exhibited by the vehicle 12 during the drift test. In addition, in consideration of the multiple overlapping relationships and dependencies that may exist between these aspects of the amount of vehicle drift and other driving variables, for example, time, the distance traveled by the vehicle 12, etc., it will further understood that the drift characteristics exhibited by the vehicle 12 during the drift test may be quantified as functions of different variables than those specifically set forth and explained above.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle testing apparatus for determining a drift of a vehicle from trajectory data indicative of a trajectory of the vehicle during a drift test, comprising:
    a processor configured to execute instructions stored in a memory to:
        determine an initial local vehicle heading based on an initial trajectory dataset of the trajectory data indicative of a portion of the trajectory of the vehicle after permitting the vehicle to travel without a steering input, and
        determine, for the vehicle, an amount of drift indicative of a deviation of the vehicle from the initial local vehicle heading based on a comparison between the initial local vehicle heading and a drift test dataset of the trajectory data indicative of a subsequent portion of the trajectory of the vehicle and representative of the drift characteristics of the vehicle.

2. The vehicle testing apparatus of claim 1, wherein the processor is further configured to execute instructions stored in the memory to:
    judge the vehicle as failing the drift test if the amount of drift exceeds a predetermined amount of deviation from the initial local vehicle heading.

3. The vehicle testing apparatus of claim 1, wherein the initial trajectory dataset is indicative of a portion of the trajectory of the vehicle subsequent to permitting the vehicle to travel without a steering input for a predetermined portion of the trajectory.

4. The vehicle testing apparatus of claim 1, wherein the drift is indicative of a lateral deviation of the vehicle from the initial local vehicle heading.

5. The vehicle testing apparatus of claim 4, wherein the drift is indicative of a time derivative of the lateral deviation of the vehicle from the initial local vehicle heading.

6. The vehicle testing apparatus of claim 5, wherein the processor is further configured to execute instructions stored in the memory to judge the vehicle as failing the drift test if:
    the lateral deviation exceeds a predetermined amount of a lateral deviation from the initial local vehicle heading, and
    the time derivative of the lateral deviation exceeds a predetermined amount of a time derivative of the lateral deviation from the initial local vehicle heading.

7. The vehicle testing apparatus of claim 1, wherein the processor is further configured to execute instructions stored in the memory to determine the initial local vehicle heading by:
    estimating a vector tangent to the trajectory of the vehicle corresponding to the initial trajectory dataset and using the tangent vector as a baseline for the initial local vehicle heading.

8. The vehicle testing apparatus of claim 1, wherein:
    the data is indicative of a lateral deviation of the vehicle at a longitudinal position along the trajectory from a centerline corresponding to an exemplary trajectory of the vehicle while responsive to a manual steering input; and
    the processor is further configured to execute instructions stored in the memory to determine the initial local vehicle heading by:
        determining an average heading of the vehicle corresponding to the initial trajectory dataset,
        adjusting at least the initial trajectory dataset to compensate for an angular offset between the average heading and the centerline, and
        estimating a vector tangent to the trajectory of the vehicle corresponding to the adjusted initial trajectory dataset and using the tangent vector as a baseline for the initial local vehicle heading.

9. The vehicle testing apparatus of claim 8, wherein the processor is further configured to execute instructions stored in the memory to adjust the initial trajectory dataset to compensate for an angular offset between the average heading and the centerline according to the equation:

adjusted initial trajectory dataset=sin(θ)*x+D,
wherein:

θ is the angular offset between the average heading and the centerline, x is a longitudinal position along the trajectory, and D is a lateral deviation of the vehicle from the centerline at the longitudinal position along the trajectory.

10. The vehicle testing apparatus of claim 9, wherein the processor is further configured to execute instructions stored in the memory to perform the comparison between the initial local vehicle heading and the drift test dataset, using the tangent vector as a baseline for the initial local vehicle heading, according to the equation:

adjusted initial trajectory dataset=sin(θ+α)*x+D,
wherein:

α is an angular offset between the tangent vector and the average heading.

11. A method of performing a drift test for a vehicle, comprising:
receiving, in a memory, trajectory data indicative of a trajectory of the vehicle during a drift test; and
determining, using a processor in communication with the memory:
an initial local vehicle heading based on an initial trajectory dataset of the trajectory data indicative of a portion of the trajectory of the vehicle subsequent to permitting the vehicle to travel without a steering input, and
for the vehicle, an amount of drift indicative of a deviation of the vehicle from the initial local vehicle heading based on a comparison between the initial local vehicle heading and a drift test dataset of the trajectory data indicative of a subsequent portion of the trajectory of the vehicle representative of the drift characteristics of the vehicle.

12. The method of claim 11, wherein the initial trajectory dataset is indicative of a portion of the trajectory of the vehicle subsequent to permitting the vehicle to travel without a steering input for a predetermined portion of the trajectory.

13. The method of claim 11, further comprising:
judging, using the processor, the vehicle as failing the drift test if the amount of drift exceeds a predetermined amount of deviation from the initial local vehicle heading.

14. The method of claim 11, wherein the drift is indicative of a lateral deviation of the vehicle and of a time derivative of the lateral deviation of the vehicle from the initial local vehicle heading, further comprising:
judging, using the processor, the vehicle as failing the drift test if:
the lateral deviation exceeds a predetermined amount of a lateral deviation from the initial local vehicle heading, and
the time derivative of the lateral deviation exceeds a predetermined amount of a time derivative of the lateral deviation from the initial local vehicle heading.

15. The method of claim 11, further comprising:
determining, using the processor, the initial local vehicle heading by estimating a vector tangent to the trajectory of the vehicle corresponding to the initial trajectory dataset and using the tangent vector as a baseline for the initial local vehicle heading.

16. The method of claim 11, wherein the data is indicative of a lateral deviation of the vehicle at a longitudinal position along the trajectory from a centerline corresponding to an exemplary trajectory of the vehicle while responsive to a manual steering input, further comprising:
determining, using the processor, the initial local vehicle heading by:
determining an average heading of the vehicle corresponding to the initial trajectory dataset,
adjusting at least the initial trajectory dataset to compensate for an angular offset between the average heading and the centerline, and
estimating a vector tangent to the trajectory of the vehicle corresponding to the adjusted initial trajectory dataset and using the tangent vector as a baseline for the initial local vehicle heading.

17. The method of claim 16, further comprising:
adjusting, using the processor, the initial trajectory dataset to compensate for an angular offset between the average heading and the centerline according to the equation:

adjusted initial trajectory dataset=sin(θ)*x+D,
wherein:

θ is the offset between the average heading and the centerline, x is a longitudinal position along the trajectory, and D is a lateral deviation of the vehicle from the centerline at the longitudinal position along the trajectory.

18. The method of claim 17, further comprising:
performing, using the processor, the comparison between the initial local vehicle heading and the drift test dataset, using the tangent vector as a baseline for the initial local vehicle heading, according to the equation:

adjusted initial trajectory dataset=sin(θ+α)*x+D,
wherein:

α is an angular offset between the tangent vector and the average heading.

19. The method of claim 11, further comprising compiling the data by gathering, in order:
an alignment dataset indicative of the trajectory of the vehicle while responsive to a steering input configured to steer the vehicle along a predetermined centerline,
a settling dataset indicative of the trajectory of the vehicle while traveling without a steering input for a predetermined portion of the trajectory,
the initial trajectory dataset, indicative of a portion of the trajectory of the vehicle subsequent to the predetermined portion of the trajectory, and
the drift test dataset.

20. A method of performing a drift test for a vehicle, comprising:
compiling trajectory data indicative of a lateral deviation of the vehicle at a longitudinal position along the trajectory from a centerline corresponding to an exemplary trajectory of the vehicle while responsive to a manual steering input by gathering, in order, at least:
an initial trajectory dataset indicative of the trajectory of the vehicle subsequent to permitting the vehicle to travel without a steering input for a predetermined portion of the trajectory, and
a drift test dataset indicative of the trajectory of the vehicle for a second predetermined portion of the trajectory and representative of the drift characteristics of the vehicle;
receiving the data in a memory; and
using a processor in communication with the memory to execute instructions stored in memory to:

determine an angular offset between the centerline and an average heading of the vehicle corresponding to the initial trajectory dataset;

estimate an angular offset between the average heading and a vector tangent to the trajectory of the vehicle corresponding to the initial trajectory dataset, and determine an amount of drift of the vehicle by adjusting the initial trajectory dataset according to the equation:

adjusted initial trajectory dataset=$\sin(\theta+\alpha)*x+D$, wherein:

$\theta$ is the angular offset between the average heading and the centerline, $\alpha$ is the angular offset between the tangent vector and the average heading, x is a longitudinal position along the trajectory, and D is a lateral deviation of the vehicle from the centerline at the longitudinal position along the trajectory.

\* \* \* \* \*